US007815501B1

(12) United States Patent
Mayeroff

(10) Patent No.: US 7,815,501 B1
(45) Date of Patent: Oct. 19, 2010

(54) METHOD AND DEVICE FOR CONDUCTING A GAME DISPLAYING SYMBOLS IN A GEOMETRIC ARRANGEMENT

(76) Inventor: Jason Mayeroff, 95 So, 24 Sukhumvst Road, Bangkok (TH) 10110

( * ) Notice: Subject to any disclaimer, the term of this patent is extended or adjusted under 35 U.S.C. 154(b) by 756 days.

(21) Appl. No.: 11/804,073

(22) Filed: May 17, 2007

Related U.S. Application Data

(63) Continuation-in-part of application No. 10/627,450, filed on Jul. 25, 2003, now abandoned.

(60) Provisional application No. 60/402,982, filed on Aug. 12, 2002.

(51) Int. Cl.
*G06F 17/00* (2006.01)

(52) U.S. Cl. .................................................... 463/13

(58) Field of Classification Search .............. 463/1–253
See application file for complete search history.

(56) References Cited

U.S. PATENT DOCUMENTS

| | | | | |
|---|---|---|---|---|
| 5,823,873 | A | 10/1998 | Moody | |
| 6,722,974 | B2 * | 4/2004 | Sines et al. | 463/12 |
| 7,255,642 | B2 * | 8/2007 | Sines et al. | 463/13 |
| 7,628,689 | B2 * | 12/2009 | Snow | 463/13 |
| 2001/0000778 | A1 * | 5/2001 | Sines et al. | 463/11 |
| 2004/0251630 | A1 * | 12/2004 | Sines et al. | 273/274 |
| 2006/0121976 | A1 * | 6/2006 | Odom | 463/19 |
| 2009/0156281 | A1 * | 6/2009 | David | 463/13 |

* cited by examiner

*Primary Examiner*—Ronald Laneau
(74) *Attorney, Agent, or Firm*—Robert Ryan Morishita; Morishita Law Firm LLC

(57) ABSTRACT

A method for conducting a card game includes defining a card template containing a plurality of card positions in the form of a geometric shape having at least two dimensions wherein the card positions in the card template are each assigned to at least one of two or more game hands. The player places a wager. Cards are randomly selected and arranged in the card positions of the card template. A player may opt to relocate the playing cards in the card template, such as by shifting the cards around the perimeter of the geometric shape. A final hand is formed for each game hand of the card template and the finals hands are rewarded according to a pay table. The present invention also includes a device for conducting such a method.

17 Claims, 12 Drawing Sheets

| | 1st | 2nd | 3rd | 4th | 5th |
|---|---|---|---|---|---|
| Royal Flush | 800 | 2400 | 1600 | 3200 | 4000 |
| Four of a Kind | 80 | 160 | 240 | 320 | 400 |
| Straight Flush | 50 | 100 | 150 | 200 | 250 |
| Full House | 10 | 20 | 30 | 40 | 50 |
| Flush | 7 | 14 | 21 | 28 | 35 |
| Straight | 5 | 10 | 15 | 20 | 25 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

| | 1st | 2nd | 3rd | 4th | 5th |
|---|---|---|---|---|---|
| Royal Flush | 800 | 2400 | 1600 | 3200 | 4000 |
| Four of a Kind | 80 | 160 | 240 | 320 | 400 |
| Straight Flush | 50 | 100 | 150 | 200 | 250 |
| Full House | 10 | 20 | 30 | 40 | 50 |
| Flush | 7 | 14 | 21 | 28 | 35 |
| Straight | 5 | 10 | 15 | 20 | 25 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

METHOD AND DEVICE FOR CONDUCTING A GAME DISPLAYING SYMBOLS IN A GEOMETRIC ARRANGEMENT

RELATED APPLICATION DATA

The present application is a continuation-in-part of U.S. patent application Ser. No. 10/627,450, entitled "Gaming Device and Method Displaying Symbols in a Polygon Arrangement," filed Jul. 25, 2003 now abandoned which, in turn, claimed the priority of U.S. Provisional Application Ser. No. 60/402,982, entitled "Gaming Device and Method Displaying Symbols In A Polygon Arrangement," filed Aug. 12, 2002 by Applicant herein.

FIELD OF THE INVENTION

The present invention relates to electronic wagering game methods and devices. More specifically, the present invention is a multi-hand game in which symbols are displayed in a geometric arrangement, and one or more hands are formed using symbols having a predefined relationship on the geometric shape.

BACKGROUND OF THE INVENTION

Video draw poker (also referred to as simply "video poker") is a well known game. Video poker is typically conducted through an electronic device such as a personal computer, a hand-held device, or gaming machine. While there are variations on the rules and pay tables used to conduct video poker, most follow the same general procedure without regard to the platform used to conduct the game.

In conventional video poker, the player makes a wager. This could take the form of a player allocating stored game credits, depositing currency, tokens, coins, vouchers, or the like, allocating a portion of a deposit or credit balance from a wagering account or credit account, respectively, or otherwise allocating value (whether real or fictional) for play of the game. After the wager is made, place commences with the random selection of an game hand of cards for the player. This could take place through the random generation of one or more random numbers by a data processor, and selecting one or more playing cards mapped to those random number(s). Typically, the data representing the cards are not arranged in any order and are typically configured in a data string representing the cards of the deck in no particular order. In certain versions, the replacement cards may also be selected at the same time, although these are not displayed to the player with the game hand.

The five cards selected to the game hand are displayed in a straight row. The player, using an input device such as a touch screen on the game display, buttons on the a button panel, keyboard, mouse, or the like, selects which cards to hold (or conversely, which cards to discard), if any, from the game hand. The discarded cards are replaced in a display with a corresponding number of replacement cards. The final hand is formed by the held cards plus any replacement cards. The final hand is compared to a pay table of winning hands. Typically, the schedule of winning hands correlates the hands in conventional poker with a pay out. For example, in a game in which no wild cards are designated, a player with a hand ranked at Jacks or Better or higher would receive at least a return of the player's wager. If the player has a winning final hand, e.g. the player has a hand of Jacks or Better, the player is rewarded with a pay out based upon the player's wager. For example, in one common pay table, a hand containing a straight (non-suited cards of sequential rank) is rewarded at 4:1. If the player does not have a winning hand, the player's wager is retained by the game, that is, lost by the player.

There are many variations on conventional video poker. For example, wild cards may be designated such as in the well known games of Deuces Wild, Jokers Wild and Jokers and Deuces Wild. There are also variations in which a player may conduct multiple hands that use the same "held" cards and receive independently generated replacement cards such as that shown and described in U.S. Pat. No. 5,823,873 to Moody, titled "Method of Playing Electronic Video Poker Games."

SUMMARY OF THE INVENTION

The present invention includes a method and device for conducting a card game for a player using playing cards. A device according to an embodiment of the present invention includes a data processor in communication with a video display, a wager handling device, an input device, and a data storage. The data storage stores data representing playing cards and data representing a pay table of winning hands and corresponding awards. Additionally, the data storage stores data representing a card template containing a plurality of card positions around a geometric shape. Optionally, the card positions are arranged around the perimeter of a closed geometric shape such as a polygon. The card positions in the card template are each assigned to at least one of two or more game hands. Optionally, at least one card position is shared between two of the game hands. For example, in an optional embodiment in which the geometric shape is a two dimensional polygon, each side of the polygon forms an game hand and the card position at each vertex is shared in the game hands corresponding to the adjacent sides meeting at the vertex. In another optional embodiment, the geometric shape may be three dimensional, such as a geometric solid or lattice. For example, in one such optional embodiment, adjacent card locations in the lattice form an game hand and the card position at each intersection is shared in the game hands meeting at the intersection.

In an optional embodiment, the game method includes receiving a wager from the player. Optionally, the wager is received at the wager handling device. In response to receiving the wager, playing cards are randomly selected. Optionally, the playing cards are selected from playing card data stored at the data storage. In an optional embodiment, the selection of playing cards for the card template may include selecting the playing cards from a separate set of playing cards for different areas of the card template. For example, where the geometric shape is a polygon, a different set of playing cards, e.g. a different deck of playing cards, may be used to select the playing cards for each side of the polygon.

The randomly selected playing cards are arranged in the card positions of the card template to form two or more game hands. Optionally, the card template containing the playing cards is displayed at a display. An option to relocate the playing cards in the card positions of the card template, and thereby change the cards assigned to the game hands, is received from the player. Optionally, the option is received through the input device. In response to the player opting to relocate the playing cards, the locations of the cards is changed. For example, in an optional embodiment in which the card positions are located around the perimeter of a geometric shape, the playing cards may be relocated by shifting the cards a selected number of card positions about the perimeter of the geometric shape.

A final hand is formed for each game hand of the card template. In an optional stud poker embodiment, the final hand and the game hand are identical. In an optional draw poker embodiment, the final hand may be formed by receiving input from the player, optionally through an input device, designating zero or more cards in each game hand for replacement. Each designated card is discarded and replaced.

The final hands to the pay table and, if any of the final hands for a winning hand, the award corresponding to the winning hand is issued.

DESCRIPTION

Figure 1:
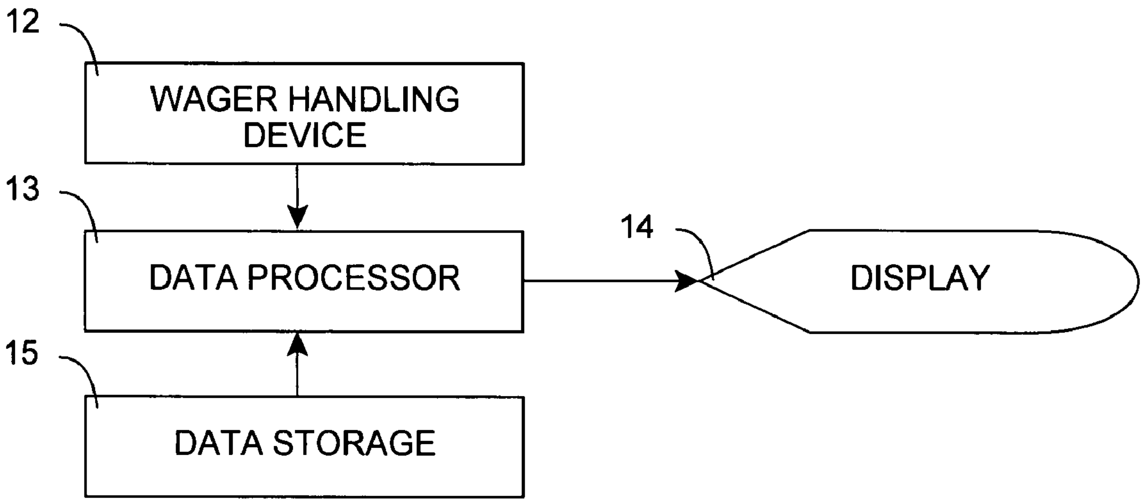
FIG. 1 is a block diagram of a device according to an embodiment of the present invention.

Reference is now made to the figures wherein like parts are referred to by like numerals throughout. Turning to FIG. 1 there is shown a device for playing an embodiment of the game according to the present invention. The device includes a housing which contains a data processor 13, optionally in the form of a computer microprocessor, and a wager handling device 12. The wager handing device 12 could take any form, including an internal credit register, a voucher receiver, bill acceptor, coin receiver, or the like. In an optional embodiment, the wager handling device 12 may also function to issue rewards, such as a ticket-in, ticket-out receiver/printer, an internal credit register, or the like. The housing also supports a display 14 which is controlled by the data processor 13 as hereinafter described. An input device 16 may be provided. In an optional embodiment, the display and the input device 16 may be combined into a touchscreen display or similar display that can receive input from a player.

A data storage 15 may also be provided. The data storage 15 stores parameters for the game, such as a card template (described in greater detail below), playing card data, and a pay table of winning hands and corresponding pay outs, video images, and instructions executable by the data processor 13 to conduct the game.

Figure 2:
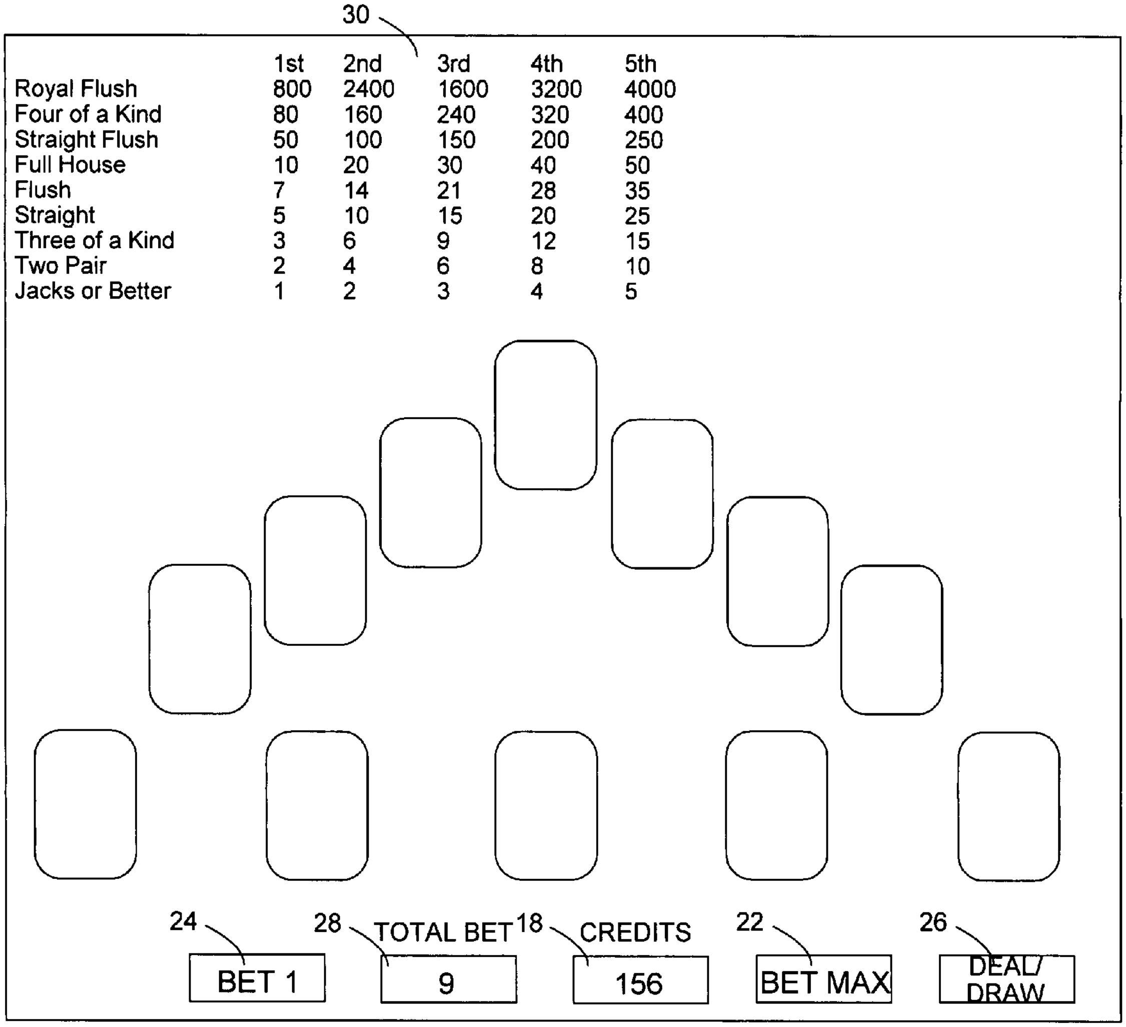
FIG. 2 is a front view of a display of a device according to an embodiment of the present invention.

Turning to FIG. 2, a display for an embodiment of the present game may include a credit meter 18 and various options for inputting a wager, such as a BET MAX button 22 which prompts the data processor 13 to debit the maximum amount permitted to be wagered and accept that as the wager as well as prompt play of the hands of play as hereinafter described. Additionally, a BET 1 button 24 may be provided to allow the player to input a wager amount. A bet meter 28 may be provided to display the wager amount being wagered by the player for a game. In an optional embodiment, the player's wager is allocated among the game hands of the card template. This allocation may be performed by the player or by the data processor 13.

Figure 6:
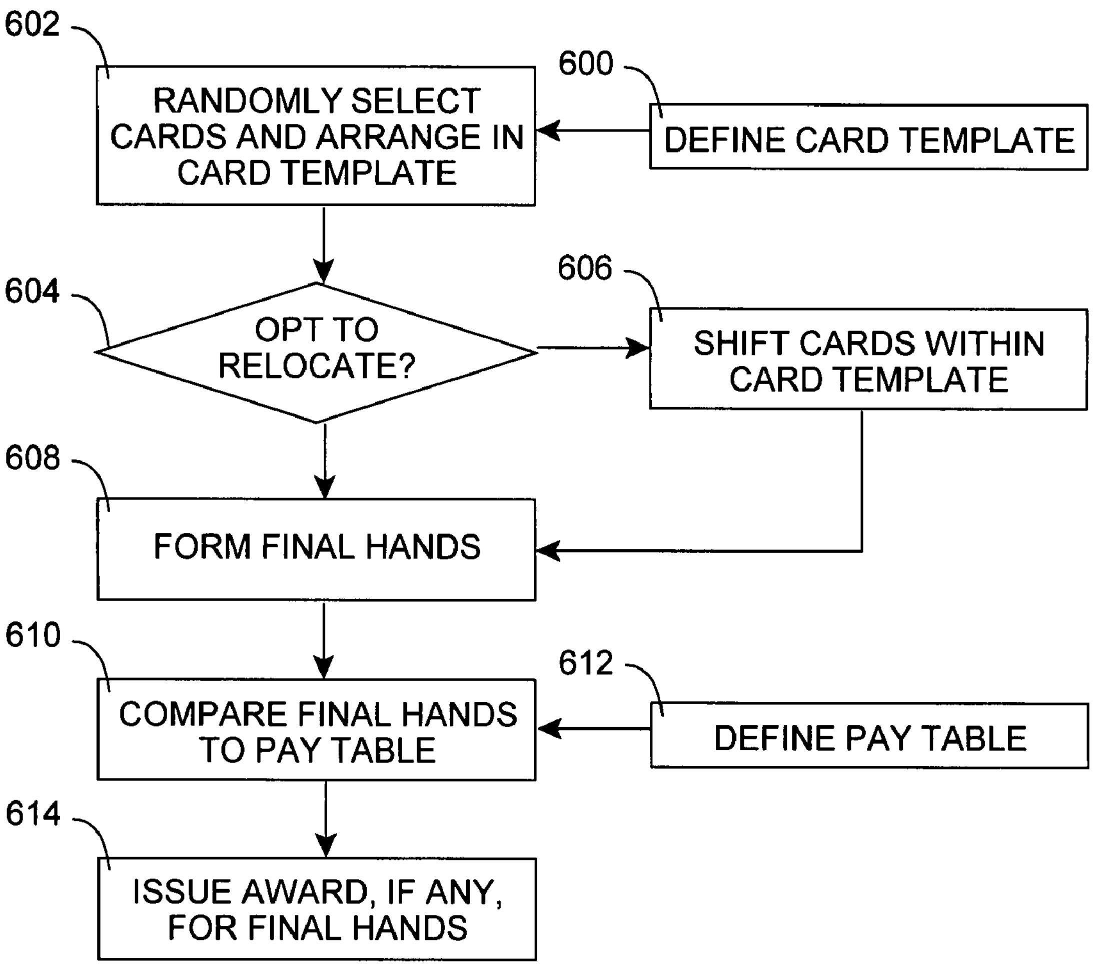
FIG. 6 is a flow chart of a method according to an embodiment of the present invention.

Referring to FIGS. 2 and 6, in response to the wager, a game is conducted. Optionally, the player signals the end of wagering by pressing a DEAL/DRAW button 26. If the player has used the BET MAX button 22, the data processor 13 may commence the game without the player pressing the DEAL/DRAW button 26.

The data processor 13 randomly selects 602 cards for the predefined card template 600 from the playing card data stored at the data storage 15. The playing card data could take any form, including one or more decks of playing cards, one or more truncated decks of playing cards (such as one or more "Spanish" decks), one or more supplemented decks (such as one or more decks of cards including Joker or other supplemental cards), or the like. Additionally, it is noted that, in an optional embodiment, certain cards within the deck, such as deuces, may be designated wild cards. In an optional embodiment described in greater detail below multiple decks may be provided with the selection of cards for different portions of the card template being selected from separate decks.

The card template could take any form. In an optional embodiment, the card template includes card positions arranged in a geometric shape. The geometric shape may be two-dimensional or three-dimensional. For example, in an optional embodiment, the card template may include card positions arranged around the perimeter of a closed two-dimensional geometric shape such as a polygon. In an other example, the card template may include card positions arranged along the surface or edges of a three-dimensional geometric solid or a three-dimensional lattice.

The card positions are each assigned to one of two or more game hands. Put another way, game hands are formed from groupings of card positions. In an optional embodiment, the game hands may share at least one card position. For example, in an optional embodiment in which the card template is a two-dimensional polygon, game hands may be formed by the sides of the polygon with card positions at the vertices shared by the game hands formed by the adjacent sides meeting at the vertex. Similarly, in an example where the card template is a three-dimensional geometric solid or lattice, adjacent card positions may form game hands and card positions at the intersections of game hands may be shared by the intersecting game hands.

Figure 3A:
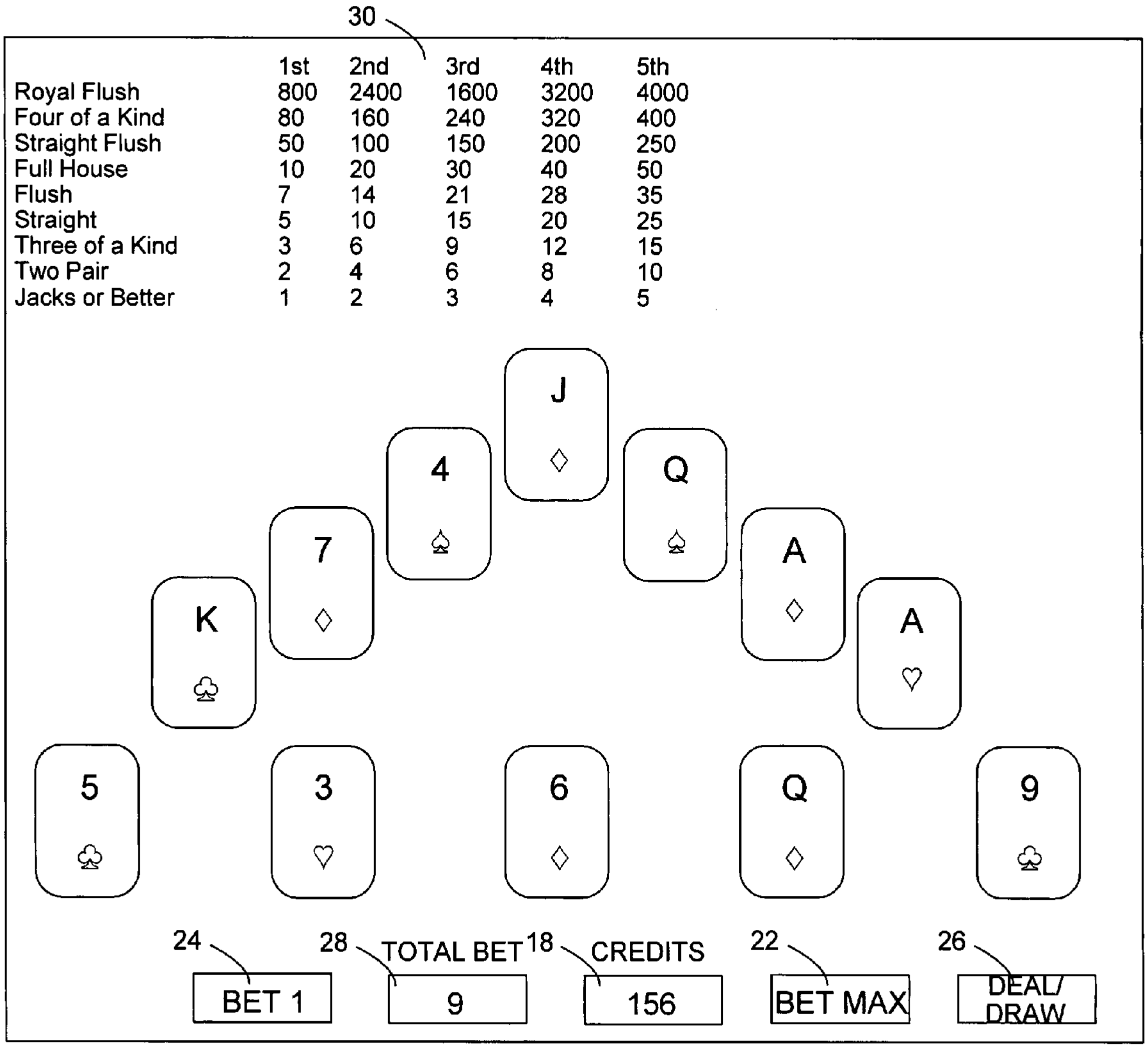
FIG. 3A is a front view of a display of a game conducted according to an embodiment of the present invention.

For example, as shown in FIG. 3A, the geometric shape is a triangle. It is noted that the shape could take any form, e.g. circle, square (or rectangle), pentagon, and so forth. In the optional example of FIG. 3A, the card template includes three game hands, with one hand for each side of the triangle. In this optional embodiment, game hands are disposed along adjacent sides share a common card at the vertex. That is, the game hands of the example of FIG. 3A are: 5♧ 3♡ 6♢ Q♢ 9♧ (bottom side), J♢ Q♤ A♢ A♡ 9♧ (right side), and J♢ 4♤

7♢ K♧ 5♧ (left side). As may be apparent, the left side and bottom side share 5♧, the right side and bottom side share 9♧, and the left side and right side share J♢.

Referring to FIG. 6, in an optional embodiment, the player may opt 604 to relocate the playing cards within the playing card template. For example, in an optional embodiment where the playing card positions are around the perimeter of a closed geometric shape, the player may have the option to shift 606 the playing cards around the perimeter. This has the effect of being able to form different game hands based on the same cards since the location of the cards in the card template determines the game hands formed.

Figure 3B:
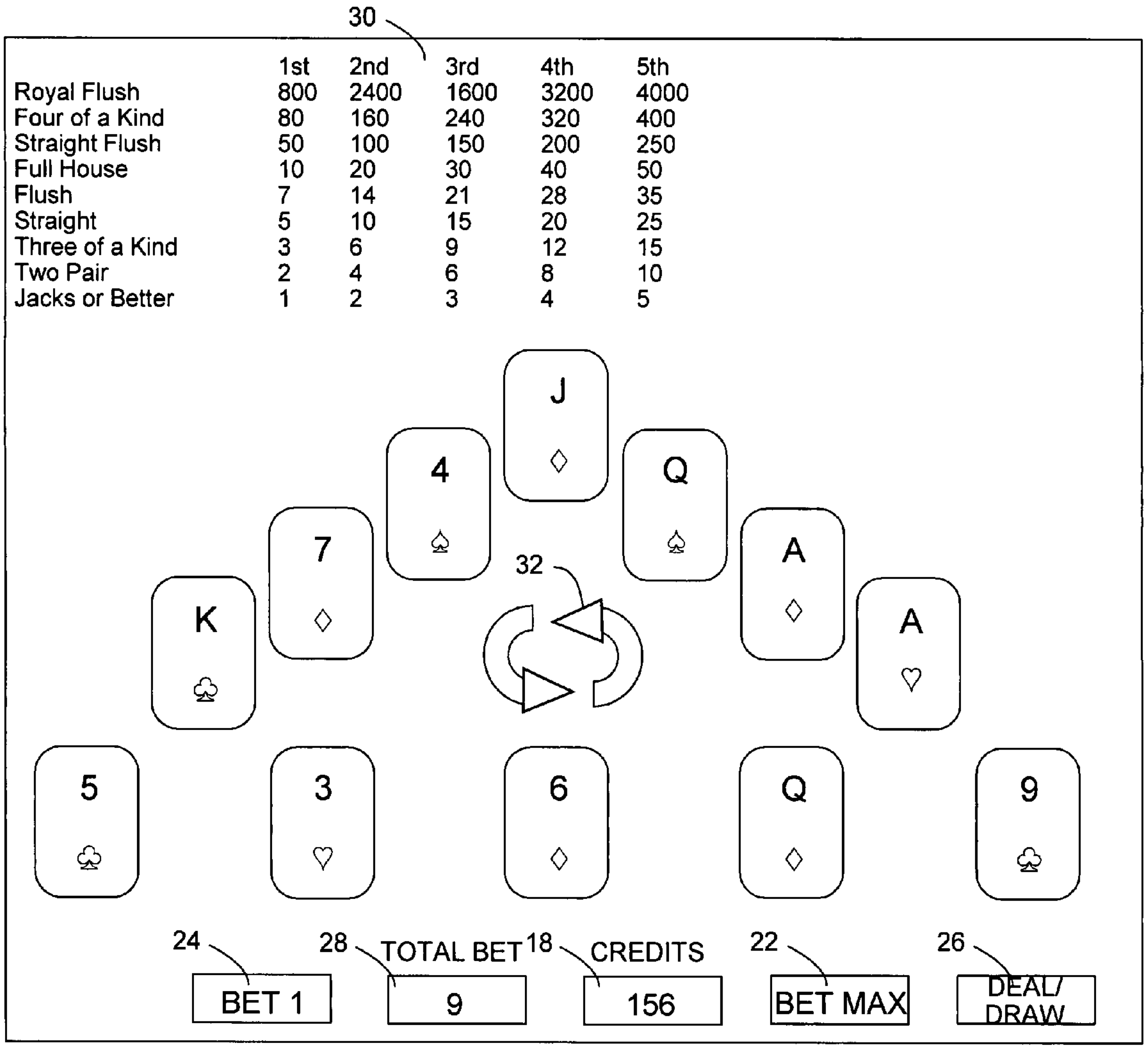
FIG. 3B is a front view of the display of FIG. 3A at a later stage in a game conducted according to an embodiment of the present invention.
Figure 3C:
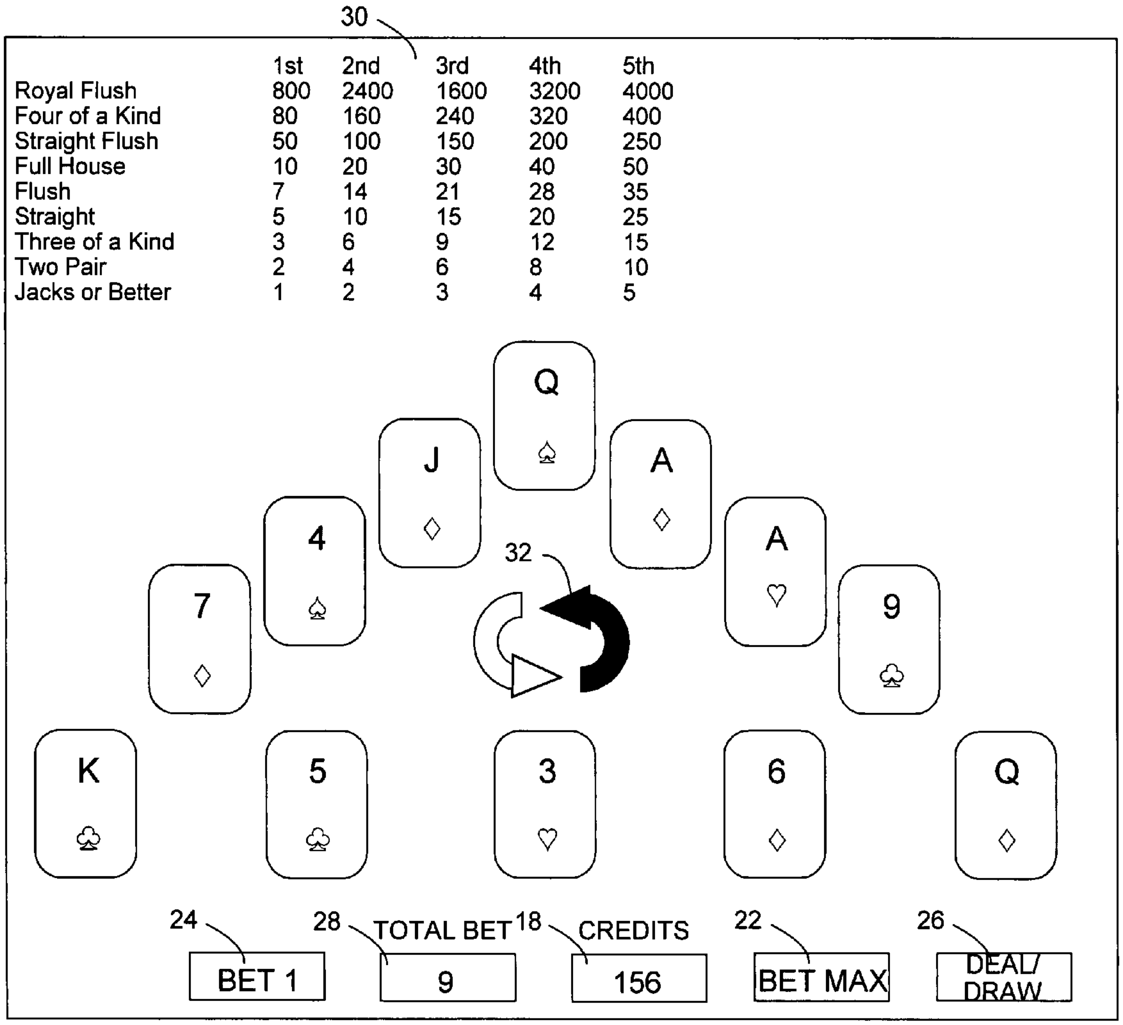
FIG. 3C is a front view of the display of FIG. 3A at a later stage in a game conducted according to an embodiment of the present invention.

For example, in FIG. 3B, the player is presented with the option of shifting the playing cards in the card template. It is contemplated that the player may be allowed to designate the amount of the shift. For example, the player may be presented with arrow symbols 32 which cause the cards to shift by one position with each actuation. In an optional embodiment, a time limit may be imposed on the player to input the shift; in an alternate optional embodiment, no time limit may be imposed on the player. In the example shown in FIG. 3C, the player has actuated the counter-clockwise arrow button once to shift the cards by one position in a counter-clockwise direction. Thus, in FIG. 3C, the hands have become: K♧ 5♧ 3♡ 6♢ Q♢ (bottom side), Q♤ A♢ A♡ 9♧ Q♢ (right side), and Q♤ J♢ 4♧ 7♢ K♧ (left side). In this example, the player has chosen this shift to form a hand of two pair in the right side game hand.

In an alternate optional embodiment, the amount of the shift may be determined by the data processor. For example, a player who wishes to shift the card positions may press a SPIN button (not shown) and the cards may be shifted by a random number of positions. It is noted that in one optional embodiment, the sequence of the cards remains the same, i.e. the card order does not change, but position of the sequence of the cards in the card template changes.

Referring to FIG. 6, the player forms 608 final hands based on the game hands. In an optional stud poker embodiment, the game hands may be the final hands. In other words, in an optional embodiment, nothing further is done to form a final hands after the player opts whether to relocate the cards in the card template.

Figure 3D:
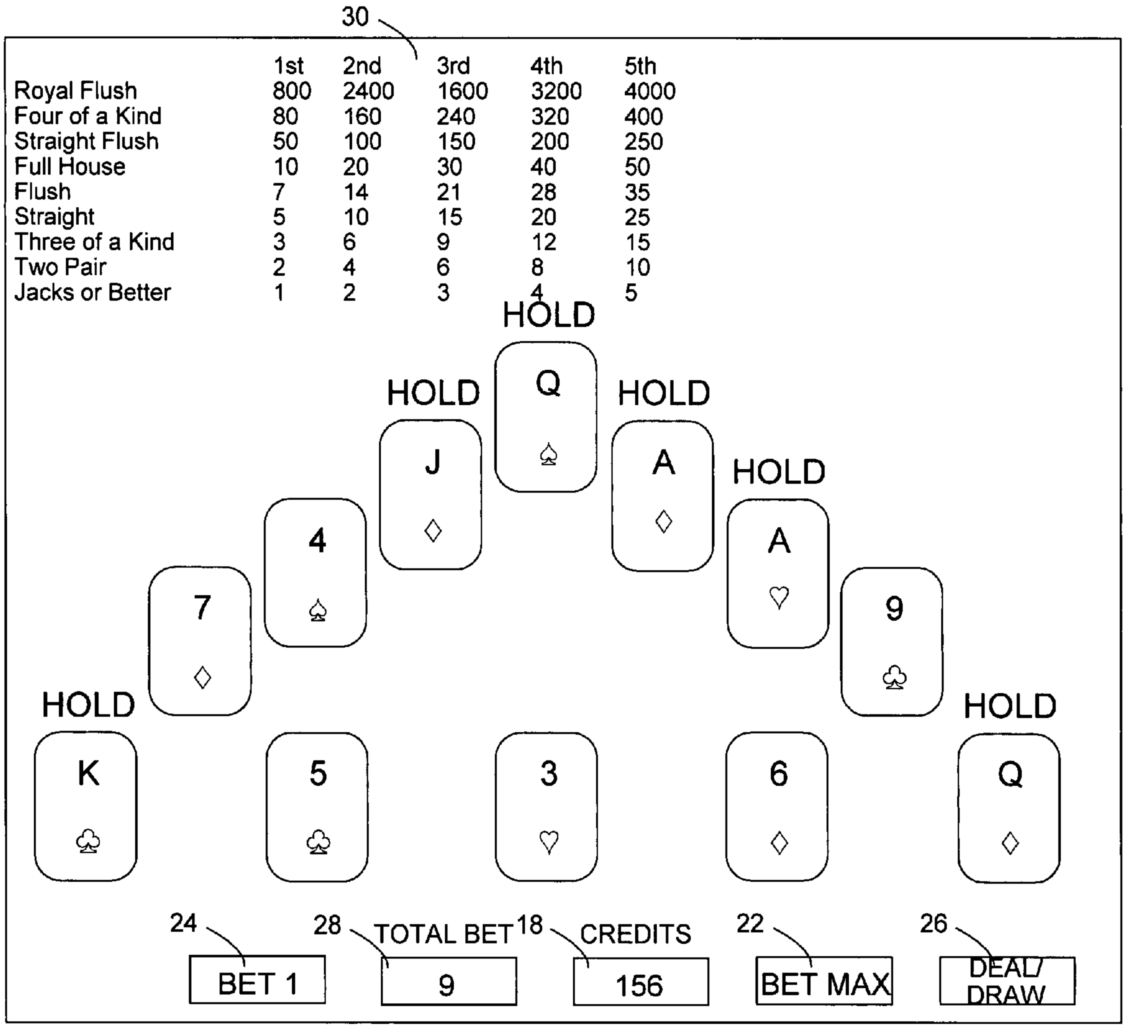
FIG. 3D is a front view of the display of FIG. 3A at a later stage in a game conducted according to an embodiment of the present invention.

In an optional draw poker embodiment, the final hands are formed by the player designating zero or more cards from each hand to discard and replace. For example, in an optional embodiment, the player may select which cards to discard (or, conversely, which cards to hold) and press the DEAL/DRAW button 26. FIG. 3D illustrates an example of the cards that a player may choose to hold in the example game.

Figure 3E:
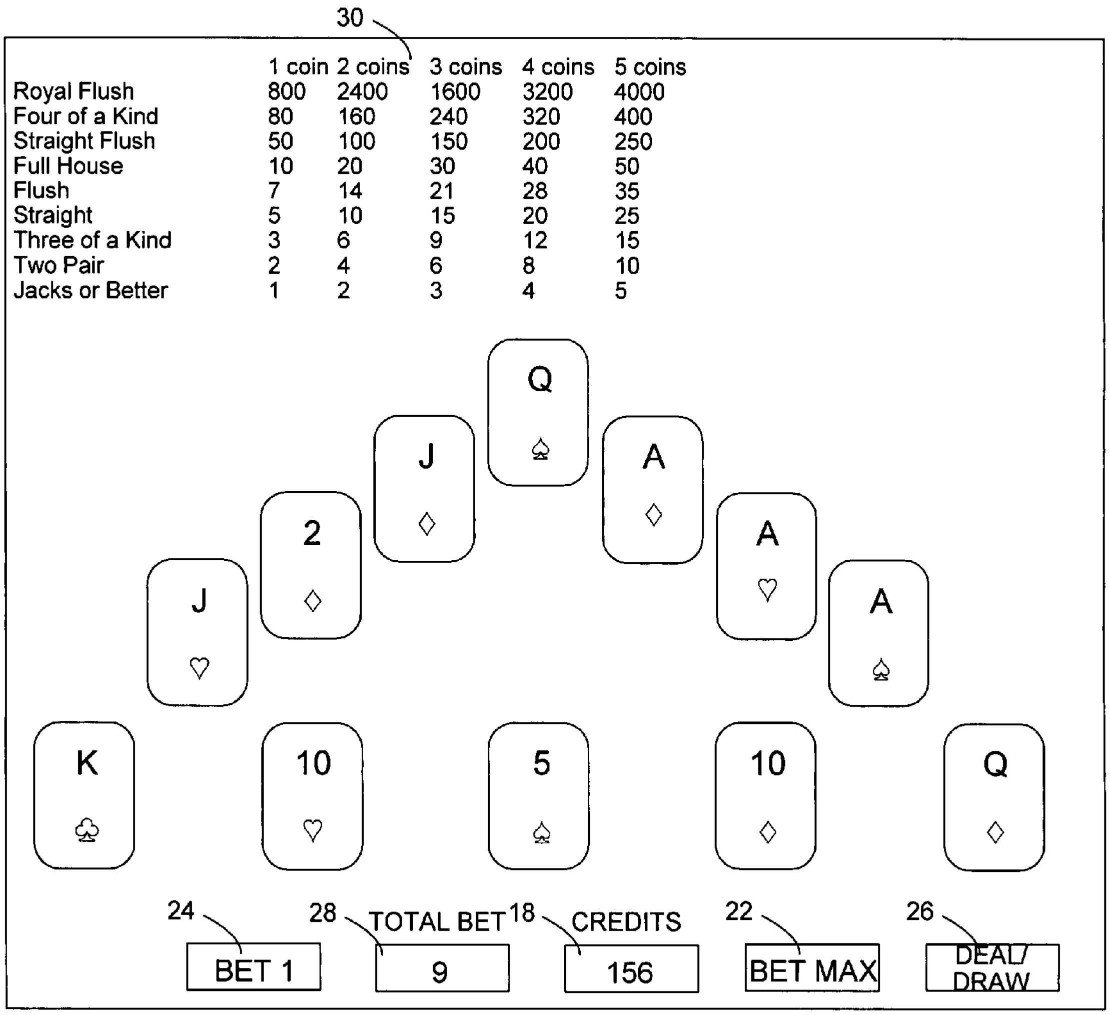
FIG. 3E is a front view of the display of FIG. 3A at a later stage in a game conducted according to an embodiment of the present invention.

As shown in FIG. 3E, the cards to be discarded are removed from the card template and replaced with newly dealt cards. In an optional embodiment in which game hands are dealt from separate decks, the replacements may be dealt from separate decks, optionally depleted of the cards in that game hand, i.e. so a duplicate card is not dealt to the final hand. In the example hand, after the replacement cards are dealt, the final hands are: K♧ 10♡ 5♤ 10♢ Q♢ (bottom side), Q♤ A♢ A♡ A♤ Q♢ (right side), and Q♤ J♢ 2♢ J♡ K♧ (left side).

The final hands are compared 610 to a pay table. In a device according to an embodiment of the present invention, the pay table is stored in a data storage 15 and the comparison is made by the data processor 13. In the example, the pay table 30 is also displayed. As may be appreciated, the pay table shown in the figures is exemplary only and should not be interpreted as limiting. In an optional embodiment, the final hands formed in the card template may be broken out so the player can see the final hands for which the awards are determined. If any of the final hands are winning hands according to the pay table, the player is issued 614 a corresponding award.

Figure 3F:
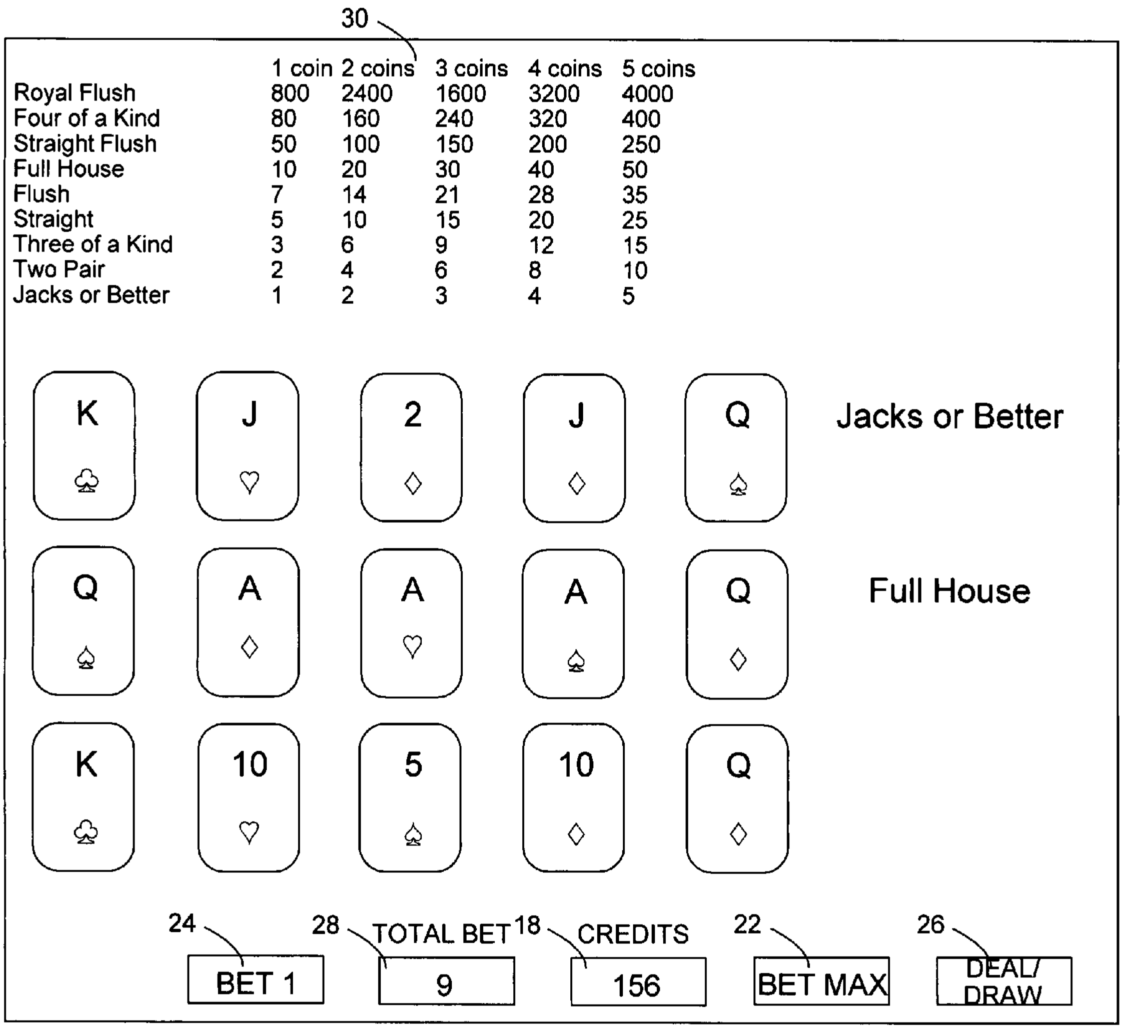
FIG. 3F is a front view of the display of FIG. 3A at a later stage in a game conducted according to an embodiment of the present invention.

Thus, in FIG. 3F, the final hand formed by the bottom side is not rewarded since a pair of tens is not a winning hand, the final hand formed by the right side is rewarded because it forms a full house, and the final hand formed by the left side is rewarded because it forms a pair of Jacks. If the player wagered nine credits with three credits allocated to each side of the triangle-shaped card template, the player would be issued an award of three credits for obtaining Jacks or better in one final hand and thirty credits for obtaining full house in another final hand. In an optional embodiment, if the player does not obtain a winning hand, the wager is lost, i.e. retained by the game device.

Figure 4A:
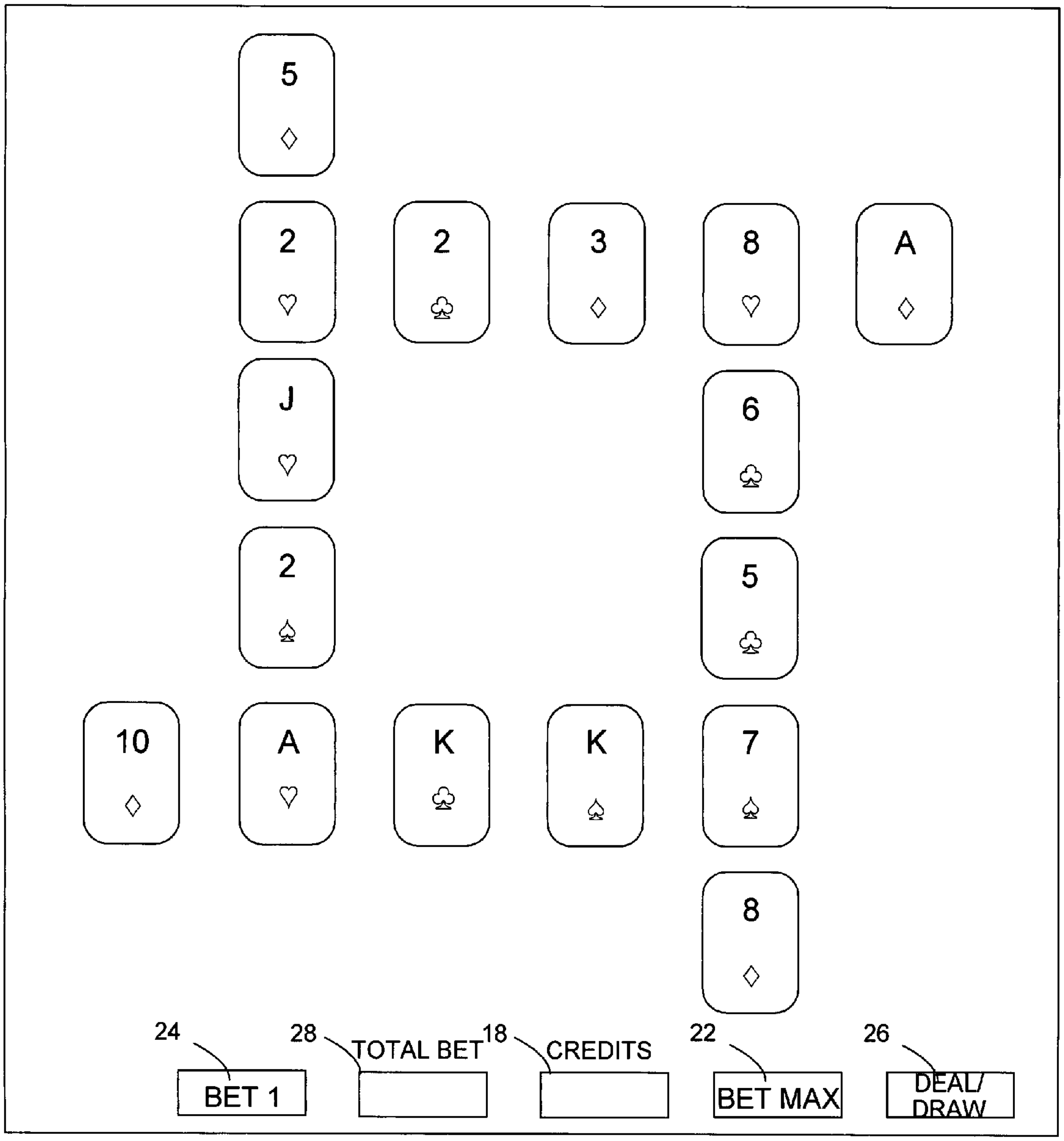
FIG. 4A is a front view of a display of a game conducted according to an embodiment of the present invention.
Figure 4B:
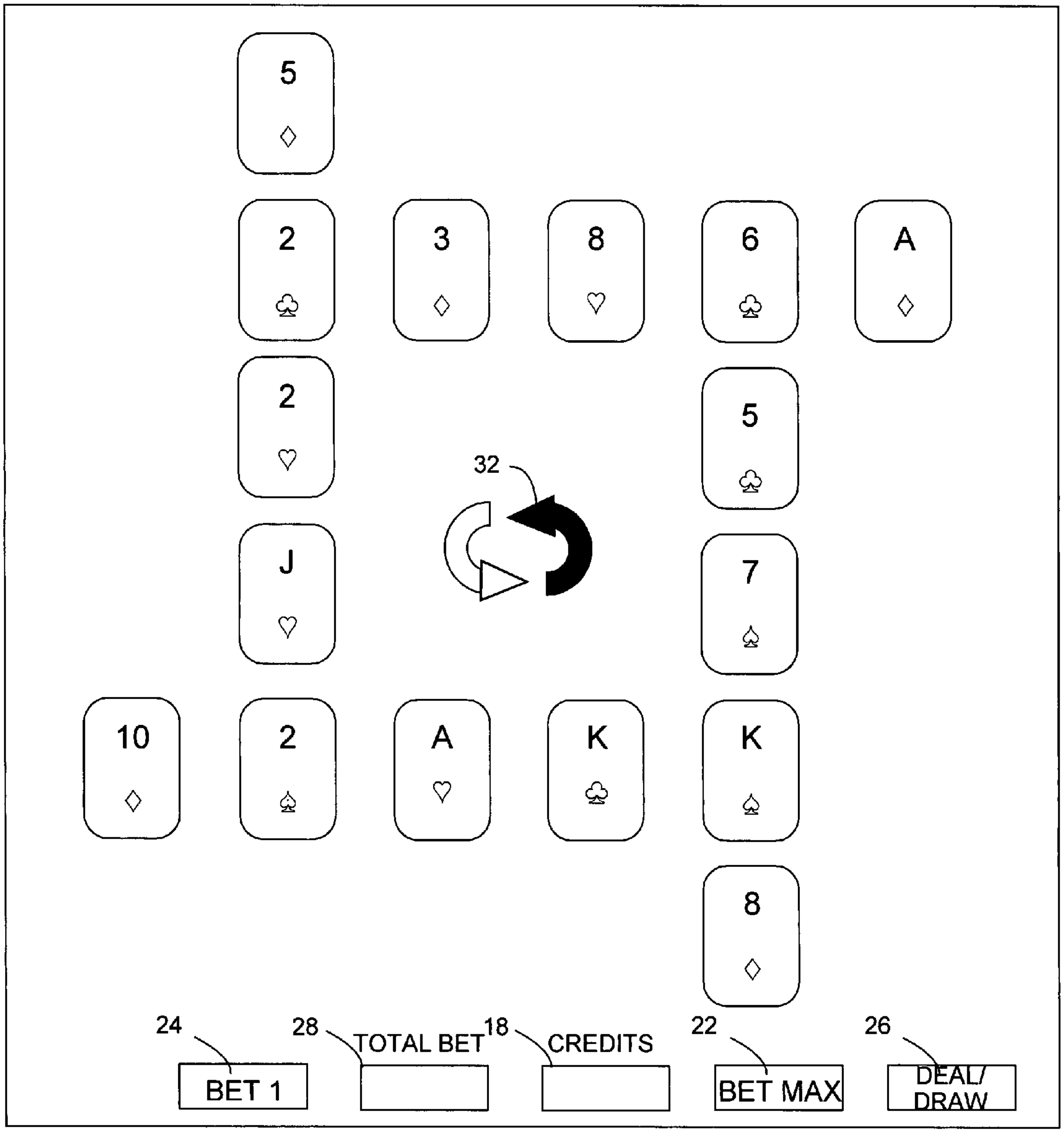
FIG. 4B is a front view of the display of FIG. 4A at a later stage in a game conducted according to an embodiment of the present invention.

It is noted that the card template could take many different forms. For example, FIG. 4A illustrates a card template that is substantially square with an overhanging card on the end of each game hand. In this example, the games hands formed are: 5♢ 2♡ J♡ 2♤ A♡, 10♢ A♡ K♧ K♤ 7♤, 8♢ 7♤ 5♧ 6♧ 8♡, and 2♡ 2♧ 3♢ 8♡ A♡. As may be appreciated, in such an optional embodiment, all the card positions may be involved in any shift, or only those cards enclosing the polygon, e.g. square, may be involved in a shift. FIG. 4B illustrates the latter optional embodiment with a single shift counter-clockwise in which the cards enclosing the polygon are shifted but the cards in the overhanging ends are not, i.e. the cards 5♢ 10♢ 8♢ and A♢ are fixed while the remaining cards are shifted.

Figure 5:
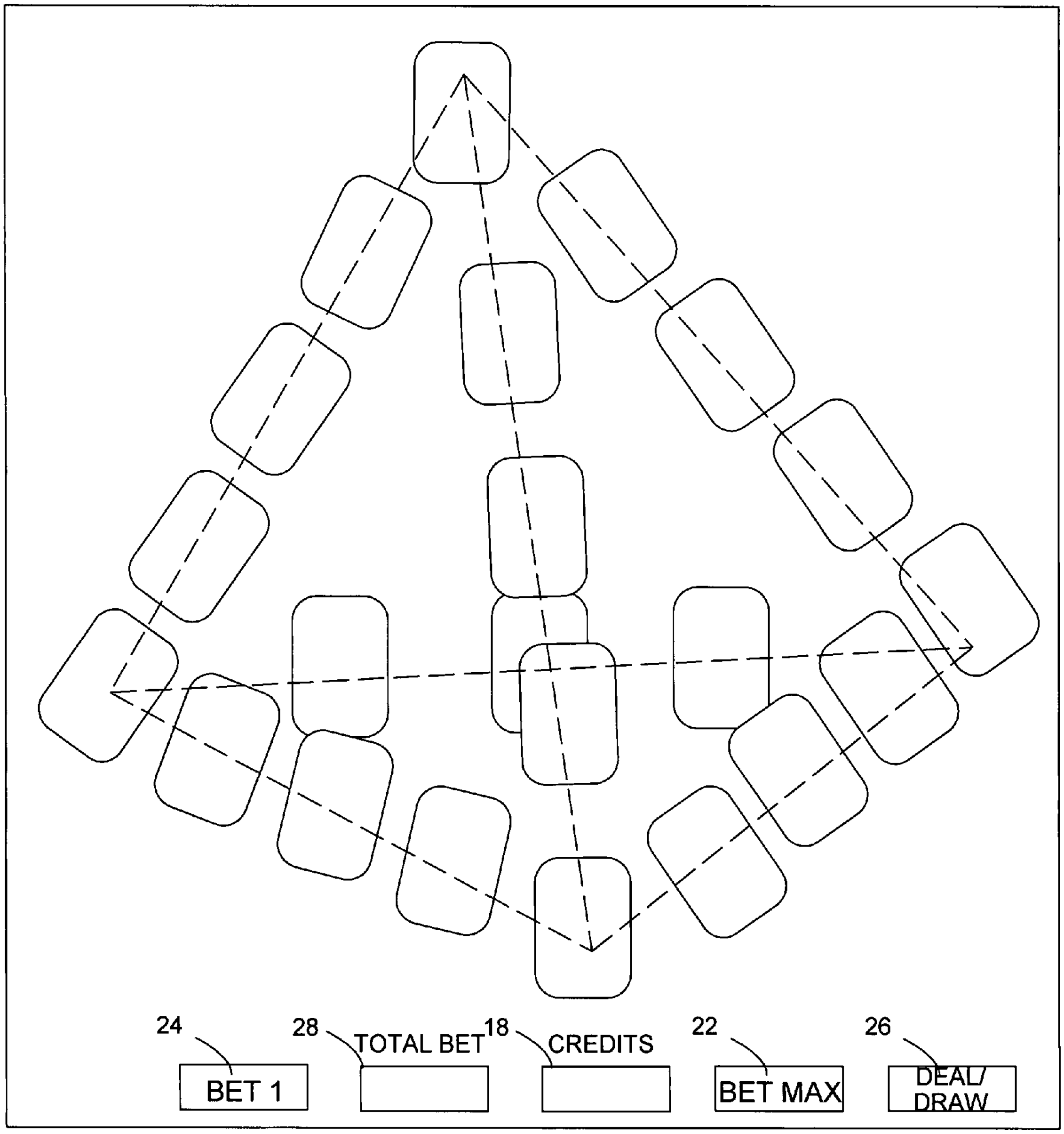
FIG. 5 is a front view of a display of a device according to an embodiment of the present invention.

FIG. 5 illustrates a card template that is three-dimensional. In this example, the card template is in the form of a tetrahedron with the cards disposed along the edges of the triangular faces. In this manner, six hands are provided, with the cards at the vertices shared among three hands. As may be appreciated, with each additional hand, the complexity in shifting cards and forming final hands increases.

The arrangement of the hands in a card template in a geometric form can also provide for bonuses based on certain combinations obtained in designated locations in the card template (such as in the vertices, or in adjacency around the perimeter, or the like). For example, the present method allows for multi-card flushes or straight flushes in excess of the five card hands. Thus, in an optional embodiment, the pay table may include, for example, six-card winning hands formed by any grouping of six cards in the card template.

It should further be noted that certain hands may be played according different rules and evaluated according to different portions of a pay table. For example, final hands formed along certain edges of a polygon may be played according to a draw poker embodiment while final hands formed along different edges of the same polygon may be played according to a stud poker embodiment. Additionally or alternatively, final hands formed along certain edges of a polygon may be evaluated according to a pay table in which deuces are wild cards, while final hands formed along different edges of the same polygon may be evaluated against a pay table without wild cards.

While certain embodiments of the present invention have been shown and described it is to be understood that the present invention is subject to many modifications and changes without departing from the spirit and scope of the invention presented herein.

I claim:

1. A device for conducting a card game for a player comprising:

a data processor;

a video display in communication with said data processor;

a wager handling device in communication with said data processor;

an input device in communication with said data processor;

a data storage adapted to store data representing playing cards, data representing a pay table of winning hands and corresponding awards, data representing a card template containing a plurality of card positions around the perimeter of a closed geometric shape wherein said card positions in said card template are each assigned to at least one of two or more game hands with at least one card position shared between two of said game hands, and instructions executable by said data processor to conduct a game comprising:

receiving a wager from said player at said wager handling device;

in response to receiving said wager, randomly selecting playing cards from said playing card data stored at said data storage;

arranging said randomly selected playing cards in the card positions of said card template to form two or more game hands;

receiving from said player through said input device an option to relocate said playing cards in said card positions of said card template to change the playing cards assigned to said game hands and, in response to said player opting to relocate said playing cards, said data processor changing the location of said playing cards in said card template to thereby change the playing cards assigned to said game hands;

forming a final hand for each game hand of said card template;

comparing said final hands to said pay table; and issuing the corresponding award if any of said final hands form a winning hand.

2. The device of claim 1 wherein said final hands are identical to said game hands.

3. The device of claim 1 wherein said step of forming said final hands in said instructions stored at said data storage comprises:

receiving input from said player through said input device designating zero or more playing cards in each game hand for replacement; and discarding and replacing each designated playing card.

4. The device of claim 1 wherein said closed geometric shape stored at said data storage is a polygon such that each side of said polygon forms a game hand and the card position at each vertex is shared in the game hands corresponding to the adjacent sides meeting at said vertex.

5. The device of claim 4 wherein said step of randomly selecting playing cards for said card template in said instructions stored at said data storage includes selecting said playing cards from a separate set of playing cards for each side of said polygon.

6. The device of claim 1 wherein said step of relocating said playing cards in said card template comprises shifting said playing cards a selected number of card positions about said perimeter of said closed geometric shape.

7. A method for conducting a card game in a device including a data processor, a video display in communication with said data processor, a wager handling device in communication with said data processor, an input device in communication with said data processor, and a data storage adapted to store data representing playing cards and instructions executable by said data processor to conduct a game for a player using said representations of playing cards, the method comprising:

storing at said data storage a pay table of winning hands and corresponding awards;

storing at said data storage a card template containing a plurality of card positions in the form of a geometric shape having at least two dimensions wherein said card positions in said card template are each assigned to at least one of two or more game hands;

receiving a wager from said player at said wager handling device;

said data processor randomly selecting playing cards in response to receipt of said wager at said wager handling device;

said data processor arranging said randomly selected playing cards in the card positions of said card template to form two or more game hands and displaying said playing cards in said card template at said video display;

receiving from said player through said input device an option to relocate said playing cards in said card positions of said card template and, in response to said player opting to relocate said playing cards, said data processor changing the location of said playing cards in said card template to thereby change the playing cards assigned to said game hands;

said data processor forming a final hand for each game hand of said card template;

said data processor comparing said final hands to said pay table stored at said data storage; and said data processor issuing the corresponding award if any of said final hands form a winning hand according to said pay table stored at said data storage.

8. The method of claim 7 wherein said final hands formed by said data processor are identical to said game hands.

9. The method of claim 7 wherein said step of forming said final hands comprises:

receiving input from said player through said input device designating zero or more playing cards in each game hand for replacement; and said data processor discarding and replacing each designated playing card.

10. The method of claim 7 wherein said geometric shape of said card template stored at said data storage is a two dimensional polygon such that each side of said polygon forms a game hand and the card position at each vertex is shared in the game hands corresponding to the adjacent sides meeting at said vertex.

11. The method of claim 10 wherein said step of randomly selecting playing cards for said card template includes said data processor selecting said playing cards from a separate set of playing cards stored at said data storage for each side of said polygon.

12. The method of claim 10 wherein said card positions of said card template are located around the perimeter of said polygon and said step of relocating said playing cards in said card template comprises said data processor shifting said playing cards a selected number of card positions about said perimeter of said polygon.

13. The method of claim 7 wherein said card template stored at said data storage includes a three-dimensional lattice such that adjacent card locations in said lattice form a game hand and the card position at each intersection is shared in the game hands meeting at said intersection.

14. A method for conducting a card game in a device including a data processor, a video display in communication with said data processor, a wager handling device in communication with said data processor, an input device in communication with said data processor, and a data storage adapted to store data representing playing cards and instructions executable by said data processor to conduct a game for a player using said representations of playing cards, the method comprising:

storing at said data storage a pay table of winning hands and corresponding awards;

storing at said data storage a card template containing a plurality of card positions around the perimeter of a closed geometric shape wherein said card positions in said card template are each assigned to at least one of two or more game hands with at least one card position shared between two of said game hands;

receiving a wager from said player at said wager handling device;

said data processor randomly selecting playing cards in response to receipt of said wager at said wager handling device;

said data processor arranging said randomly selected playing cards in the card positions of said card template to form two or more game hands and displaying said playing cards in said card template at said video display;

receiving from said player through said input device an option to relocate said playing cards in said card positions of said card template to change the playing cards assigned to said game hands;

said data processor forming a final hand for each game hand of said card template by said data processor receiving input from said player through said input device designating zero or more playing cards in each game hand for replacement and discarding and replacing each designated playing card;

said data processor comparing said final hands to said pay table stored at said data storage; and said data processor issuing the corresponding award if any of said final hands form a winning hand according to said pay table stored at said data storage.

15. The method of claim 14 wherein said geometric shape of said card template stored at said data storage is a two dimensional polygon such that each side of said polygon forms a game hand and the card position at each vertex is shared in the game hands corresponding to the adjacent sides meeting at said vertex.

16. The method of claim 15 wherein said step of randomly selecting playing cards for said card template includes said data processor selecting said playing cards from a separate set of playing cards stored at said data storage for each side of said polygon.

17. The method of claim 15 wherein said step of relocating said playing cards in said card template comprises said data processor shifting said playing cards a selected number of card positions about said perimeter of said polygon.

* * * * *